United States Patent
Brust et al.

(10) Patent No.: US 8,192,008 B2
(45) Date of Patent: *Jun. 5, 2012

(54) INKJET PRINTING SYSTEM AND INK

(75) Inventors: Thomas B. Brust, Webster, NY (US); Catherine A. Falkner, Rochester, NY (US); Paul D. Yacobucci, Rochester, NY (US); Kurt M. Schroeder, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 951 days.

This patent is subject to a terminal disclaimer.

(21) Appl. No.: 12/229,937

(22) Filed: Aug. 28, 2008

(65) Prior Publication Data

US 2010/0055322 A1   Mar. 4, 2010

(51) Int. Cl.
*G01D 11/00* (2006.01)

(52) U.S. Cl. ...... 347/100; 347/95; 106/31.13; 106/31.6; 523/160

(58) Field of Classification Search .......... 347/100, 347/95, 96, 101, 102; 106/31.6, 13.13, 31.27; 523/160, 161

See application file for complete search history.

(56) References Cited

U.S. PATENT DOCUMENTS

| | | | | |
|---|---|---|---|---|
| 5,679,754 A | * | 10/1997 | Larson et al. | 528/28 |
| 6,136,890 A | * | 10/2000 | Carlson et al. | 523/160 |
| 6,613,859 B2 | | 9/2003 | Shores | |
| 7,828,426 B2 | | 11/2010 | Brust et al. | |
| 2003/0166742 A1 | * | 9/2003 | Hirasa et al. | 523/160 |
| 2006/0142474 A1 | * | 6/2006 | Moore et al. | 524/589 |
| 2006/0223908 A1 | * | 10/2006 | Szajewski et al. | 523/160 |
| 2010/0055323 A1 | * | 3/2010 | Brust et al. | 427/256 |

FOREIGN PATENT DOCUMENTS

| | | |
|---|---|---|
| EP | 1 416 006 A1 | 5/2004 |
| EP | 1 426 422 A1 | 6/2004 |

* cited by examiner

*Primary Examiner* — Manish S Shah

(74) *Attorney, Agent, or Firm* — Arthur E. Kluegel; Andrew J. Anderson

(57) ABSTRACT

An inkjet printing system includes an inkjet printer responsive to digital signals and containing an ink composition having: (a) water, (b) dispersed pigment particles, (c) a humectant, and (d) a polyurethane additive having at least a first soft segment having siloxane groups, the additive having a weight average molecular weight of at least 10,000 daltons and a sufficient number of acid groups to provide an acid number greater than 60. An improved combination of scratch resistance and jetability is obtained.

25 Claims, 1 Drawing Sheet

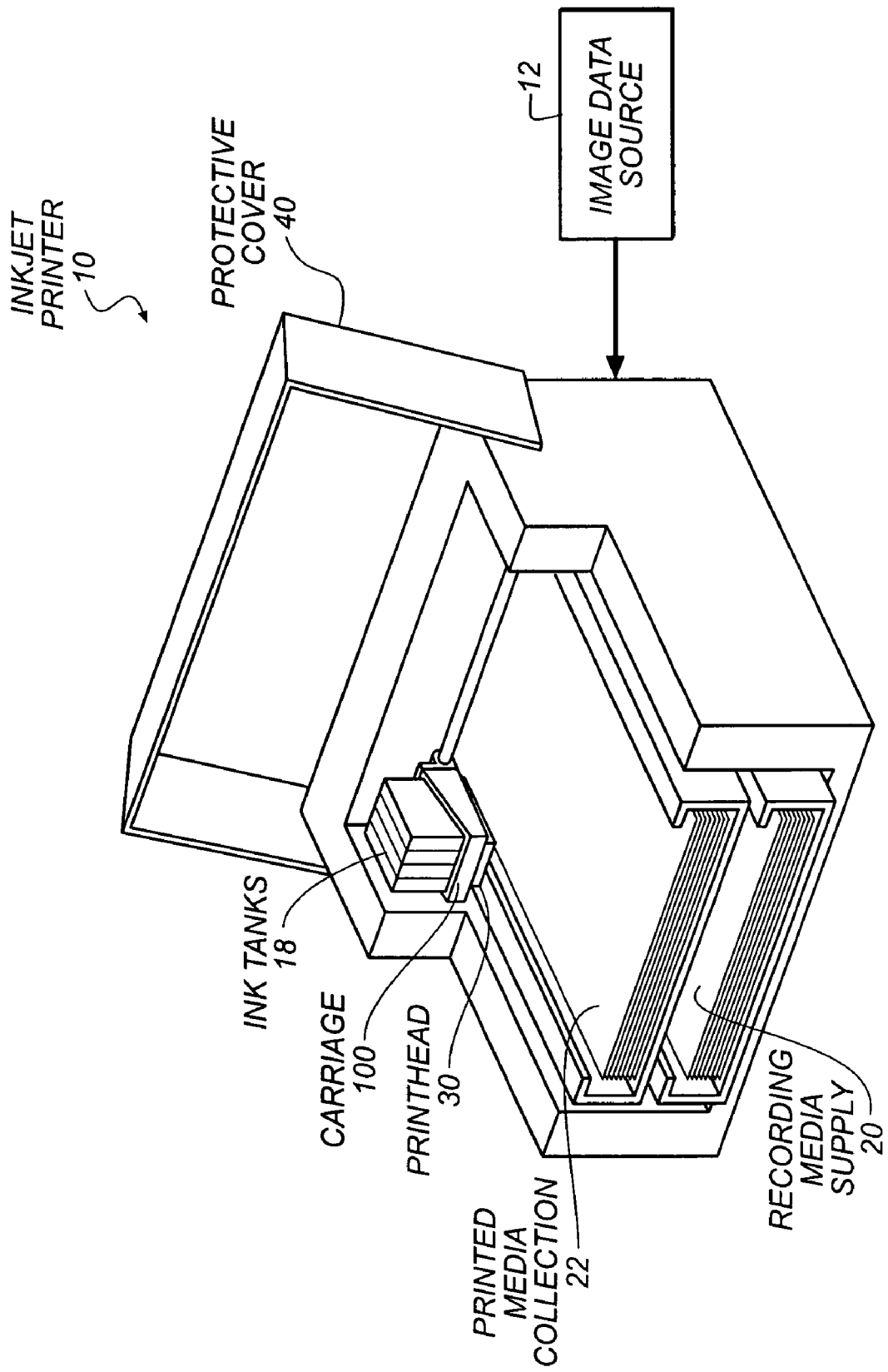

INKJET PRINTING SYSTEM AND INK

FIELD OF THE INVENTION

The invention relates generally to the field of pigmented and clear inks for inkjet printing, and in particular to inks which are useful for thermal inkjet printing. More specifically, the invention relates to pigmented and clear inks for high-speed thermal inkjet printing which result in durable images.

BACKGROUND OF THE INVENTION

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to short run printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment-based inks have a number of drawbacks. Great lengths must be undertaken to reduce a pigment particle to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

A second drawback of pigmented inks is their durability after printing, especially under conditions where abrasive forces have been applied to the printed image. Pigment-based inks typically reside at the surface of the imaging receiver to which they are printed and this makes the printed images particularly susceptible to abrasive forces. To this extent, pigmented inks have been formulated with various polymer binders, dispersants and other addenda to provide durable images that can withstand post printing physical abuse and environmental conditions.

The degree of abrasion resistance of a printed image is also a function of time after printing. At short time intervals after printing, typically from a few minutes to a few hours, the ink undergoes several complex dynamic changes. As the ink contacts the receiver, some of the components penetrate into the receiver and the droplets can simultaneously spread laterally on the receiver surface. Carrier fluids such as water and humectants are drawn into the receiver by capillary forces and the polymer binders begin to film form. At short time intervals the binder film formation is incomplete and the resulting pigment cake is particularly susceptible to abrasive forces. In some cases, the incomplete polymer binder film formation results in a tacky surface that can stick to surfaces within the printer that transport the printed image. Typically, the more total fluid that is printed to the receiver (and hence more water) the longer it takes for the ink to dry and form a durable image.

The abrasion resistance of the image is further affected by the presence of humectants, which are necessary for optimal firing performance, but which are retained in the pigment cake for some period of time. Since most humectants have much lower vapor pressures than water, they are relatively slow to evaporate and can be retained in the image receiver for several hours. Humectants can have the effect of plasticizing the polymer binder and making the surface of the image tacky or softer than if no humectant was present. Once the humectants evaporate, the resulting pigment cake, consisting primarily of pigment and binders, reaches a steady state composition and determines the long-term abrasion resistance of the printed image.

Images printed from an inkjet printer are also susceptible to abrasive forces as the image receiver is advanced through the printer. Typically, there is some mechanical means, such as a series of transport rollers, for advancing the print past the printhead and out of the printer. In some printer designs a spur wheel is used to advance the printed receiver. Spur wheels are often made from a hard plastic or metal and have the shape of a disk with points or spurs located on the periphery of the wheel. The spurs contact the printed receiver and can physically penetrate the uppermost area of the printed image leaving behind a small hole. In extreme cases the spurs can plow into the receiver and tear off small sections of the imaged areas. In either case, the mechanical abrasion caused by the spur wheel occurs at short time intervals on the order of a few seconds after printing and results in a defect that is objectionable to the eye.

Pigmented inks for inkjet printing have been formulated with acrylic polymers; however, the acrylic polymers alone are insufficient in providing durable images that resist scratches and other forms of physical abuse. A second class of polymers that have been used as abrasion resistance additives in pigment-based inks are the polyurethanes, or urethane resins as they are sometimes called. U.S. Pat. No. 6,136,890 discloses a pigment-based inkjet ink wherein the pigment particles are stabilized by a polyurethane dispersant. United States Publication Number 2004/0242726 discloses a pigment dispersed by a cross-linking step between a resin having a urethane bond and a second water-soluble polymer.

Although polyurethanes are known for their excellent abrasion resistance, they also have a number of drawbacks. For example, not all polyurethane polymers are conducive to jetting from a thermal inkjet head. In particular, water-dispersible polyurethane particles, such as those disclosed in U.S. Pat. Nos. 6,533,408 and 6,268,101, Statutory Invention Registration Number US H2113H, and United States Patent Application Publication Numbers 2004/0130608 and 2004/0229976 are particularly difficult to jet from a thermal inkjet printhead at high firing frequencies. It is highly desirable to fire inks at high firing frequencies from an inkjet printer since this is one variable that controls the speed at which the image can be printed.

Another way to improve the abrasion resistance of a printed image is to apply a clear ink as an overcoat to the image. The clear inks, also known as colorless ink compositions, are typically formulated with polymer, water, and other components commonly used in aqueous-based inkjet ink formulations, for example, humectants, organic solvents, surfactants and biocides. United States Patent Application Publication Numbers 2006/0100306 and 2006/0100308 disclose the use of polyurethanes and mixtures of polyurethanes and acrylic polymers having specified acid numbers for use in clear ink compositions. However, clear inks formulated with polyurethanes also suffer from the same short term durability issues as colored inks since they have many components in common with their colored ink counterparts. In addition, the application of a clear ink increases the total amount of water applied to the receiver and therefore slows down the drying of the imaged area of the prints. Although the application of clear ink can improve the long term durability, its application can adversely affect the short term durability due to the increased water load on the receiver.

Both pigment and clear inks can be difficult to jet through inkjet print heads having small nozzle diameters especially by the thermal inkjet printing process. In recent years, thermal inkjet printers have moved to higher jetting frequencies and smaller nozzle diameters to provide faster printing speeds with higher image quality. Thermal inkjet printers are now capable of printing (in drop volumes of 3 picoliters or less) at jetting frequencies in excess of 10 kHz and the need for higher velocity firings is a highly desirable feature. However, this high frequency firing often comes at the cost of variability in the firing velocity, which leads to poor image quality in the final printed image. In addition, the demands of current thermal inkjet printing require that the nozzles fire for a large number of firings during the life-time of a printer. As an example, a typical inkjet nozzle may be required to fire in excess of $5 \times 10^7$, and up to as many as $1 \times 10^9$, individual firing events without malfunctioning or ceasing to fire altogether.

PROBLEM TO BE SOLVED BY THE INVENTION

Although polyurethane binders have found use in inkjet inks there remains the need to provide both pigment-based and clear inks capable of providing durable images and which satisfy the demands of high frequency thermal inkjet printing. It is therefore an object of this invention to provide a clear ink for inkjet printing wherein the clear ink contains an aqueous polyurethane binder that delivers abrasion resistance to an image at both short time and long time intervals after printing and which can be jetted at high firing frequencies from an inkjet printhead.

SUMMARY OF THE INVENTION

The invention provides an inkjet printing system, comprising an inkjet printer responsive to digital signals and containing an ink composition comprising:
(a) water,
(b) dispersed pigment particles,
(c) a humectant, and
(d) a polyurethane additive having at least a first soft segment having siloxane groups, the additive having a weight average molecular weight of at least 10,000 daltons and a sufficient number of acid groups to provide an acid number greater than 60.

The invention also includes an inkjet printing method, an inkjet ink, and an inkjet ink set. The invention delivers abrasion resistance to an image at both short time and long time intervals after printing and can be jetted at high firing frequencies from an inkjet printhead

BRIEF DESCRIPTION OF THE DRAWINGS

The above and other objects, features, and advantages of the present invention will become more apparent when taken in conjunction with the following description and drawing wherein the FIGURE is a schematic view of an inkjet printer useful in the invention.

DETAILED DESCRIPTION OF THE INVENTION

The inkjet inks of the present invention are aqueous-based inks. "Aqueous-based" is defined herein to mean the ink comprises mainly water as the carrier medium for the remaining ink components. In a preferred embodiment, the inks of the present invention comprise at least about 50 weight percent water. Pigment-based inks are defined as inks containing at least a dispersion of water-insoluble pigment particles. A clear ink in the present invention is defined as an ink composition that does not contain colorants, including colored pigments or colored dyes. The clear ink is typically aqueous based and can contain humectants and polymers used in the art of inkjet printing. The clear ink can be slightly colored due to the presence of humectants, polymers or impurities, but is not intentionally colored by the addition of a colorant.

An ink-set is defined as a set of two or more inks. An ink set may contain pigment-based inks of different colors, for example, cyan, magenta, yellow, red, green, blue, orange, violet, or black. In one embodiment, a carbon black pigmented ink is used in an ink set comprising at least three inks having separately, a cyan, a magenta, and a yellow colorant. Useful ink sets also include, in addition to the cyan, magenta, and yellow inks, complimentary colorants such as red, blue, violet, orange, or green inks. In addition, the ink set may comprise light and dark colored inks, for example, light cyan and light magenta inks commonly used in the ink sets of wide format printers. It is possible to include one or more inks that comprise a mixture of different colored pigments in the ink set. An example of this is a carbon black pigment mixed with one or more colored pigments or a combination of different colored pigments. An ink-set may also include one or more pigment-based inks in combination with one or more clear inks. An ink-set may also include at least one or more pigment-based inks in combination with additional inks that are dye-based ink. An ink set may further comprise one or more inks containing a self-dispersing carbon black pigment ink which is used primarily for printing of text and a plurality of cyan, magenta, yellow, and black inks which are used primarily for photographic quality printing.

Ink compositions of the present invention comprise at least one water-dispersible polyurethane compound. "Water-dispersible" is defined herein to mean individual polymer molecules or colloidal assemblies of polymer molecules which are stably dispersed in the ink without the need for a dispersing agent. Water dispersible polyurethanes employed in the present invention may have the general formula of (I)

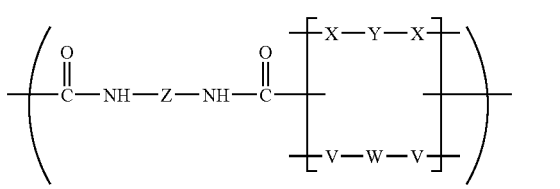

wherein Z in the structure (I) above is the central portion of the monomer unit that is the polymerization product of a diisocyanate; X—Y—X represents a soft segment comprising at least siloxane groups; W is the central portion of a unit containing an acid group; and X and V can be the same or different and are an —O— or —N— atom.

Z is desirably a hydrocarbon group having a valence of two, more desirably containing a substituted or unsubstituted alicyclic, aliphatic, or aromatic group, desirably represented by one or more of the following structures:

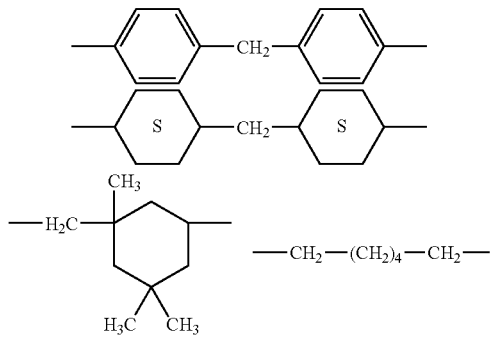

X—Y—X desirably represents a polydimethyl siloxane (PDMS) prepolymer. The PDMS segment is introduced into the polyurethane by using the prepolymer with both ends terminated with a hydroxyl (diol) or an amino (diamine) group. The prepolymer having terminal hydroxyl groups is known as a silanol terminated polydimethyl siloxane, and that having terminal amine groups is known as an aminoalkyl terminated polydimethyl siloxane. The resulting polyurethanes are herein referred to as siloxane group functionalized since they contain siloxane groups as part of the polymer composition.

Exemplary polydimethyl siloxane prepolymers useful as segment X—Y—X include those having the generic formulas IIa and IIb:

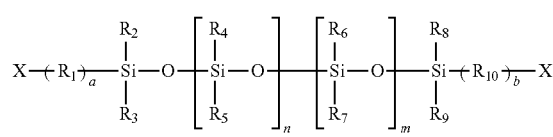

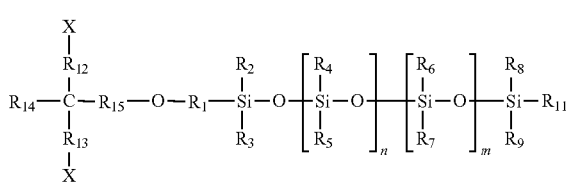

Where, $R_1$ and $R_{10}$ are each alkyl or oxyalkylene having from 1 to 10 carbon atoms, a and b are each zero or 1, $R_2$, $R_3$, $R_4$, $R_5$, $R_6$, $R_7$, $R_8$, $R_9$, $R_{11}$, $R_{12}$, $R_{13}$, $R_{14}$, and $R_{15}$ are each independently an alkyl, aryl, or arylalkyl group, the alkyl group containing 1 to 6 carbon atoms, and n and m are each from 0 to 100, such that the value of n+m is from 4 to 100.

The incorporation of soft segments of generic formula IIb into the polyurethane results in siloxane groups that are pendant (grafted) to the polymer backbone. Soft segments introduced by formula IIa result in siloxane groups that are part of the polymer backbone.

Silanol terminated PDMS prepolymers useful as soft segment X—$R_2$—X are exemplified by compounds of formula IIa-1, IIa-2, and IIa-3.

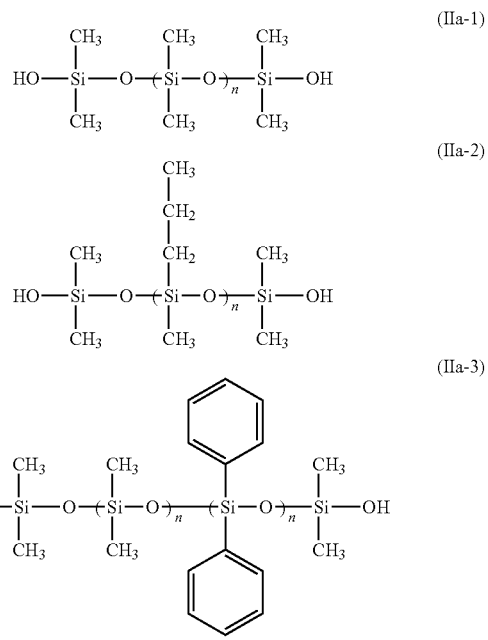

Another example of a group useful for X—Y—X is shown by formula IIb-1, where n provides the compound with a molecular weight from 1,000 to 15,000. Examples of compounds useful as structure IIb-1 include the SILAPLANE® FM-DA11, FM-DA-21, and FMDA-26 from Chisso America, Inc.

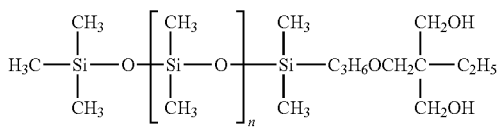

Aminoalkyl terminated PDMS prepolymers useful as soft segment X—Y—X are exemplified by Formula III. The incorporation of aminoalkyl terminated PDMS prepolymers into the polyurethane results in the formation of urea bonds in the polymer.

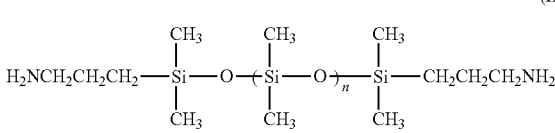

X—Y—X can include a mixture of a silanol terminated PDMS prepolymer and an aminoalkyl terminated PDMS prepolymer. X—Y—X can also include a mixture of a first soft segment comprising a silanol terminated PDMS prepolymer or aminoalkyl terminated PDMS prepolymer and at least one second soft segment polyol or polyamine prepolymer selected from, fluorinated polyether polyols, polyether polyols, polyester polyols, polycarbonate polyols, polycarprolactone polyols, polyether diamines, polyester diamines, or polycarbonate diamines. Preferred polyether diols and diamines are those sold under the trade name TERATHANE® from Dupont and trade name JEFFAMINE® D, ED, and M series from Huntsman. A particularly useful polyether polyol for the second soft segment is tetraethylene glycol and can desirably have a molecular weight between 600 and 2500. Another more useful polyether diamine is bis(3-aminopropyl) terminated polytetrahydrofuran. The second soft segment comprising polyether, polyester, fluorinated polyether, polycarbonate polyol, or polyamine can be present in the polyurethane at from 2% to 50% by weight, more desirably from 5% to 40% and most desirably from 10% to 35% based on the total weight of the polymer.

Polyurethanes of the present invention comprise sufficient amounts of silanol terminated PDMS or aminoalkyl terminated PDMS prepolymer such that the PDMS containing prepolymers are present in the final polyurethane at levels greater than or equal to 2% by weight based on the initial monomer feeds in the polymerization. More desirably, the final polymer contains greater than or equal to 5% PDMS prepolymer and most desirably greater than or equal to 10% prepolymer. PDMS modified polyurethanes of the present invention when formulated into an inkjet ink provide significant improvements to the abrasion resistance of printed images especially at short time scales after printing. Polyurethanes of the present invention comprise an upper limit of 30% silanol terminated PDMS or aminoalkyl terminated PDMS prepolymer, and more desirably an upper limit of less than or equal to 20% PDMS prepolymer.

The silanol terminated PDMS or aminoalkyl terminated PDMS prepolymer useful in the present invention typically has a molecular weight from 400 to 20,000, suitably from 400 to 15,000, and most desirably from 1000 to 15,000. When the PDMS prepolymer is used in combination with a polyether, polyfluoroether, polyester, or polycarbonate prepolymer to form the polyurethane or polyurethane-urea, it is desired that the polyether, polyfluoroether, polyester, or polycarbonate prepolymer has a molecular weight from 400 to 3000 and more desirably from 1000 to 2500.

W is desirably the central portion of a monomeric unit containing a phosphoric acid, carboxylic acid or sulfonic acid group, most desirably being carboxylic acids, such as 2,2'-bis(hydroxymethyl)propionic acid, 2,2'-bis(hydroxymethyl)butoric acid, and hydroxyethylether of 4,4'-bis(4-hydroxyphenyl)valeric acid.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group may be halogen or may be bonded to the remainder of the molecule by an atom of carbon, silicon, oxygen, nitrogen, phosphorous, sulfur, selenium, or boron. The substituent may be, for example, halogen, such as chloro, bromo, or fluoro; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy)propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentylphenoxy)acetamido, alpha-(2,4-di-t-pentylphenoxy)butyramido, alpha-(3-pentadecylphenoxy)-hexanamido, alpha-(4-hydroxy-3-t-butylphenoxy) tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-tolylcarbonyl amino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl) ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen, sulfur, phosphorous, or boron. Such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents may themselves be further substituted one or more times with the described substituent groups. The particular substituents used may be selected by those skilled in the art to attain desirable properties for a specific application and can include, for example, electron-withdrawing groups, electron-donating groups, and steric groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

Conventional processes of making polyurethane dispersions involve the steps of preparing a prepolymer having a relatively low molecular weight and a small excess of isocyanate groups and chain-extending with a chain extender the prepolymers into a high molecular weight polyurethane during the dispersion process. Besides the raw materials the polyurethane dispersions sold by various manufactures differs in the process used to prepare the prepolymers (e.g. Solvent free prepolymer process, Ketimine and Ketazine process, Hybrid system, and Ethyl acetate process), and the type of chain extender used in the dispersion step. Such materials and processes have been disclosed in, for example, U.S. Pat. No. 4,335,029; in "Aqueous Polyurethane Dispersions," by B. K. Kim, Colloid & Polymer Science, Vol. 274, No. 7 (1996) 599-611 © Steinopff Verlag 1996; and in "Polyurethane Dispersion Process," by Manea et al., Paint and Coating Industry, January 2007, Page 30.

The polyurethane dispersions useful for the practice of this invention are desirably to be prepared without involving the chain-extension step during the dispersion step. Instead it prefers to have the chemical reaction for forming urethane or urea linkages completed prior to the dispersion step. This will insure that the polyurethane dispersions used in the ink compositions of the invention have well-controlled molecular weight and molecular weight distribution and be free of gel particles.

In one particularly useful process the polyurethane used in the present invention is prepared in a water miscible organic solvent such as tetrahydrofuran, followed by neutralizing the hydrophilic groups, e.g. carboxylic acid groups, with an aqueous inorganic base, e.g. potassium hydroxide solution. The polyurethane solution is then diluted with doubly distilled de-ionized water. Finally the water miscible organic solvent is removed by distillation to form stable polyurethane dispersions. In this process the polyurethane particles are formed by precipitation during solvent evaporation.

In a second desirable process the polyurethane useful for the invention is prepared in a water immiscible organic solvent, e.g. ethyl acetate. The polyurethane is neutralized with an aqueous inorganic base and water is added to form an aqueous dispersion comprising primarily minute drops of polyurethane-water immiscible organic solvent solution suspended in water. The water immiscible organic solvent is then removed to form the desired polyurethane dispersion.

In another desirable process the polyurethane is formed by a sequential polymerization process where a soft polyurethane segment is formed first by reacting a diisocyanate compound with a silanol terminated diol or aminoalkyl siloxane diamine. The soft polyurethane segment then reacts further with a mixture of diisocyanate compound, a siloxane or polyether polyol, and a low molecular weight diol having a hydrophilic group, e.g. a carboxylic acid group.

The polyurethane of this invention has a sufficient amount of acid groups in the molecule to make the polymer usable in an aqueous-based ink. In one embodiment the polyurethane has an acid number of greater than or equal to 20. In order to achieve optimal jetting from an inkjet printhead the acid number is typically from 50 to 160, more usefully from 60 to 160, and more desirably from 60 to 130. The acid number is defined as the milligrams of potassium hydroxide required to neutralize one gram of dry polymer. The acid number of the polymer may be calculated by the formula given in the following equation: Acid number=(moles of acid monomer)*(56 grams/mole)*(1000)/(total grams of monomers) where, moles of acid monomer is the total moles of all acid group containing monomers that comprise the polymer, 56 is the formula weight for potassium hydroxide, and total grams of monomers is the summation of the weight of all the monomers, in grams, comprising the target polymer.

The acid groups on the polyurethane compounds of the present invention are at least partially neutralized (converted into salts) using monovalent inorganic base, desirably an alkaline metal hydroxide selected from the group of potassium hydroxide, sodium hydroxide, rubidium hydroxide, or lithium hydroxide. In a preferred embodiment, at least 70 percent of the available acid groups on the polymer are converted into salts using inorganic base, more desirably at least 90% of the available acid groups are converted. From a manufacturing perspective, desirably less than 100% of the acid groups are neutralized as this can lead to lack of control of the pH of the inks.

The polyurethane of this invention has a minimum weight average molecular weight of at least 10,000 daltons. Desirably, the polyurethane has a maximum weight average molecular weight of 150,000. Polyurethanes having molecular weights less than 10,000 often exhibit poor jetting performance. Molecular weights above 150,000 have negative impacts on the relatively low viscosity requirements of an inkjet ink which are desirably jetted at high frequencies and with low variability. More typically, the weight average molecular weight of polyurethane is from 10,000 to 100,000, most desirably from 20,000 to 50,000. The polyurethane dispersions useful for the practice of this invention desirably have a mean particle size of less than 100 nm and more desirably less than 50 nm.

Ink compositions of the present invention may comprise a mixture of a siloxane group functionalized polyurethane and a second polyurethane comprising soft segments having polyether, polyester, polycarbonate, polydimethylsiloxane, or polycaprolactone groups. The addition of a second non-siloxane group containing polyurethane to an ink composition can have the advantage of improving the jetting velocity of the ink or tailoring an aspect of the durability on a given substrate.

Ink compositions, both pigment-based and clear, can comprise polyurethanes of the present invention at levels from 0.1 to 10% by weight based on the total ink components. More desirable abrasion resistance can be imparted to the inkjet images when the ink composition contains from 0.5 to 10% by weight of inventive polyurethane. In one particular embodiment the polyurethane is present in the ink composition at from 0.5 to 3%. These ranges of polyurethane provide excellent jetting of the ink composition from the printhead while minimizing viscosity effects that could affect jetting performance.

The pigment particles that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is present in the milling step (a) in order to facilitate break up of the pigments into primary particles. For the pigment dispersion obtained in step (a) or the ink composition obtained in step (b), a dispersant is present in order to maintain particle stability and prevent settling. The dispersant for the pigment particles can be a surfactant, such as for example, potassium oleylmethyl taurate (KOMT), sodium dodecyl sulfate or sodium dioctyl sulfosuccinate.

Polymeric dispersants can be used to disperse the pigment particles prior to, or during the milling step. Typically, these polymeric dispersants are copolymers made from hydrophobic and hydrophilic monomers. Examples of polymeric dispersants for pigment particles include random and block copolymers having hydrophilic and hydrophobic portions; see for example, U.S. Pat. Nos. 4,597,794, 5,085,698, 5,519,085, 5,272,201, 5,172,133, 6,043,297 and PCT Patent Publication Number WO 2004/111140A1; and graft copolymers; see for example, U.S. Pat. Nos. 5,231,131, 6,087,416, 5,719,204, or 5,714,538. Among these polymeric dispersants anionic polymeric dispersants are especially useful.

Polymeric dispersants useful for dispersing the pigment particles of the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene and/or alphamethyl styrene and acrylic acid and/or methacrylic acid (such as the JONCRYL® BASF or TRUDOT® Mead Westvaco polymers) or styrene maleic anhydride and styrene maleic anhydride amic acid copolymers (such as SMA-1440, SMA-17352, SMA-1000, SMA-2000® Sartomer Inc.).

Acrylic polymeric dispersants useful in the present invention are typically formed from one or more acrylic monomer and one or more ionizable monomer, such as, for example carboxyalted or sulfonated monomers. Acrylic polymeric dispersants are typically formed from one or more hydrophobic acrylate monomer including, for example, methylmethacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate. Preferably the methacrylate or acrylate monomer is stearyl or lauryl methacrylate or acrylate. The hydrophobic portion of the polymer may be prepared from one or more of the hydrophobic monomers. Desirable carboxylated hydrophilic monomers are acrylic acid or methacrylic acid, or combinations thereof.

Typically, the weight average molecular weight of the polymeric dispersant has an upper limit such that it is less than 50,000 daltons. Desirably the weight average molecular weight of the copolymer is less than 25,000 daltons; more desirably it is less than 15,000 and most desirably less than 10,000 daltons. The copolymer dispersants preferably have a weight average molecular weight lower limit of greater than 500 daltons.

In one exemplary embodiment, the pigment particles are dispersed with a copolymer where the hydrophobic monomer is benzyl methacrylate and is present from 50 weight percent to 80 weight percent relative to the total weight of the polymeric dispersant and the hydrophilic monomer is methacrylic acid.

In a second embodiment, copolymer dispersants are employed which comprise a hydrophobic monomer having a carbon chain length of greater than or equal to 12 carbons present in an amount of at least 10% by weight of the total copolymer, and more desirably greater than 20% by weight, an optional additional hydrophobic monomer comprising an aromatic group and a hydrophilic monomer that is methacrylic acid. For example, the additional aromatic group containing monomer may be benzyl acrylate or benzyl methacrylate. An especially useful additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more typically from about 0 to 60%, and desirably from about 0 to 50%. A particularly useful embodiment of a polymeric dispersant for the pigment particles is a terpolymer of benzyl methacrylate, stearyl methacrylate and methacrylic acid. Particularly useful polymeric pigment dispersants are further described in United States Patent Application Numbers 2006/0012654 and 2007/0043144.

Encapsulating type polymeric dispersants and polymeric dispersed pigments thereof can also be used in the invention. Specific examples are described in U.S. Pat. Nos. 6,723,785, 6,852,777, and United States Patent Application Numbers 2004/0132942, 2005/0020731, 2005/00951, 2005/0075416, 2005/0124726, 2004/007749, and 2005/0124728. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, United States Patent Application Numbers 2003/0199614, 2003/0203988, or 2004/0127639. Microencapsulated-type pigment particles are also useful and consist of pigment particles coated with a resin film; see for example U.S. Pat. No. 6,074,467.

The pigment dispersions useful in pigment-based ink compositions of the present invention desirably have a median particle diameter of less than 200 nm and more desirably less than 100 nm. In a particularly useful embodiment, 90 percent of the weight of the pigment particles in the distribution have a diameter less than 100 nm and desirably less than 80 nm.

Self-dispersing pigments useful for the practice of the invention are those that have been subjected to a surface treatment such as oxidation/reduction, acid/base treatment, or functionalization through coupling chemistry. The surface treatment can render the surface of the pigment with anionic, cationic, or non-ionic groups. Examples of self-dispersing type pigments include, but are not limited to, CAB-O-JET® 200 and CAB-O-JET® 300 (Cabot Corp.), BONJET® Black CW-1, CW-2, and CW-3 (Orient Chemical Industries, Ltd.) and AQUA BLACK® 162 and 001 (Tokai Carbon, Ltd.).

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

Ink compositions, both pigment-based and clear, useful in the invention also comprise a humectant in order to achieve reliable firing at high frequency with low velocity variability. Representative examples of humectants which may be employed in the present invention include: (1) triols, such as glycerol, 1,2,6-hexanetriol, 2-ethyl-2-hydroxymethyl-propane diol, trimethylolpropane, alkoxlated triols, alkoxylated pentaerythritols, saccharides and sugar alcohols; and (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol or a mixture thereof.

Desirable humectants are polyhydric alcohols having three or more hydroxyl groups. A particularly useful humectant is glycerol. Typical aqueous-based ink compositions useful in the invention may contain 5-20 weight percent humectant(s), especially from 6-15% humectant, most desirably from 6-10% humectant. Inks comprising humectants having the aforementioned viscosity and concentration ranges are ideal for maintaining ink viscosities in an acceptable range for high speed firing from a thermal inkjet printhead with low variability in firing velocity.

The ink compositions of the present may also include, in addition to the humectant, a water miscible co-solvent or penetrant. Representative examples of co-solvents used in the aqueous-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols such as, ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds such as urea, 2-pyrrolidinone, N-methyl-2-pyrrolidinone, and 1,3-dimethyl-2-imidazolidinone; and (4) sulfur-containing compounds such as 2,2'-thiodiethanol, dimethyl sulfoxide and tetramethylene sulfone. Typical aqueous-based ink compositions useful in the invention may contain 2-10 weight percent co-solvent(s).

The pigment-based and clear ink compositions of the present invention also desirably comprise a water-soluble acrylic polymer comprising carboxylic acid groups. The term "water-soluble" is defined herein as the polymer is dissolved in water and when the polymer is at least partially neutralized with an inorganic monovalent base the resultant solution is visually clear.

The monomers for the water-soluble acrylic polymer of this invention can be selected from methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, α-methyl styrene, t-butyl styrene, vinyl toluene, butadiene, isoprene, N,N-dimethyl acrylamide, acrylic acid, methacrylic acid, chloromethacrylic acid, maleic acid and derivatives thereof. Examples of suitable monomers include allyl compounds such as allyl esters (e.g., allyl acetate, allyl caproate, etc.); vinyl ethers (e. g., methyl vinyl ether, butyl vinyl ether, methoxyethyl vinyl ether, ethoxyethyl vinyl ether, chloroethyl vinyl ether, 1-methyl-2, 2-dimethylpropyl vinyl ether, hydroxyethyl vinyl ether, diethylene glycol vinyl ether, dimethylaminoethyl vinyl ether, butylaminoethyl vinyl ether, benzyl vinyl ether, tetrahydrofurfuryl vinyl ether, etc.); vinyl esters (such as vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, etc.); vinyl heterocyclic compounds (such as N-vinyl oxazolidone, N-vinylimidazole, N-vinylpyrrolidone, N-vinylcarbazole, vinyl thiophene, N-vinylethyl acetamide, etc.); styrenes (e.g., styrene, divinylbenzene, methylstyrene, dimethylstyrene, ethylstyrene, isopropylstyrene, sodium styrenesulfonate, potassium styrenesulfinate, butylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy)styrene, methoxystyrene, 4-methoxy-3-methylstyrene, dimethoxystyrene, chlorostyrene, dichlorostyrene, trichlorostyrene, bromostyrene, iodostyrene, fluorostyrene, methyl vinylbenzoate ester, vinylbenzoic acid, etc.); crotonic acids (such as crotonic acid, crotonic acid amide, crotonate esters (e.g., butyl crotonate, etc.)); vinyl ketones (e.g., methyl vinyl ketone, etc ); olefins (e.g., dicyclopentadiene, ethylene, propylene, 1-butene, 5,5-dimethyl-1-octene, etc.); itaconic acids and esters (e.g., itaconic acid, methyl itaconate, etc.), other acids such as sorbic acid, cinnamic acid, methyl sorbate, citraconic acid, chloroacrylic acid mesaconic acid, maleic acid, fumaric acid, and ethacrylic acid; halogenated olefins (e.g., vinyl chloride, vinylidene chloride, etc.); unsaturated nitriles (e.g., acrylonitrile, etc.); acrylic or methacrylic acids and esters (such as acrylic acid, methyl acrylate, methacrylic acid, methyl methacrylate, ethyl acrylate, butyl acrylate, butyl methacrylate, 2-hydroxyethyl methacrylate, 2-acetoacetoxyethyl methacrylate, sodium-2-sulfoethyl acrylate, 2aminoethylmethacrylate hydrochloride, glycidyl methacrylate, ethylene glycol dimethacrylate, etc.); and acrylamides and methacrylamides (such as acrylamide, methacrylamide, N-methylacrylamide, N,N-dimethylacrylamide, N-isopropylacrylamide, N-s-butylacrylamide, N-t-butylacrylamide, N-cyclohexylacrylamide, N-(3-aminopropyl) methacrylamide hydrochloride, N-(3-dimethylaminopropyl) methacrylamide hydrochloride, N,N-dipropylacrylamide, N-(1,1-dimethyl-3-oxobutyl)acrylamide, N-(1,1,2-trimethylpropyl)acrylamide, N-(1,1,3,3-tetramethylbutyl)acrylamide, N-(1-phthalamidomethyl)acrylamide, sodium N-(1,1-dimethyl-2-sulfoethyl)acrylamide, N-butylacrylamide, N-(1, 1-dimethyl-3-oxobutyl)acrylamide, N-(2-carboxyethyl) acrylamide, 3-acrylamido-3-methylbutanoic acid, etc.).

The water-soluble acrylic polymer can be prepared by emulsion polymerization, solution polymerization or bulk polymerization technique well known in the art. Desirably, the water-soluble acrylic polymer has a weight average molecular weight of less than 20,000. Desirably, the polymer has a sufficient number of acid groups such that the acid number of the polymer is greater than 115.

The acid groups on the acrylic polymers are at least partially neutralized (converted into salts) using monovalent inorganic bases, desirably aqueous alkaline metal hydroxides, selected from; potassium hydroxide, sodium hydroxide, rubidium hydroxide or lithium hydroxide. In a preferred embodiment, at least 70 percent of the available acid groups on the polymer are converted into salts using monovalent inorganic base, more desirably at least 90% of the available acid groups are converted. Monovalent inorganic bases are highly preferred over organic bases such as amines as the neutralizing agents for the acrylic polymers since inks containing acrylic polymers neutralized with organic amines show very poor jetting performance in a thermal inkjet printhead.

Polymer binders which may be employed in the present invention are exemplified by those disclosed in U.S. Pat. No. 6,866,379. Specific examples of preferred water-soluble polymers useful in the present invention are copolymers prepared from at least one hydrophilic monomer that is an acrylic acid or methacrylic acid monomer, or combinations thereof. Desirably, the hydrophilic monomer is methacrylic acid.

Preferred water-soluble polymers useful in the present invention are copolymers prepared from at least one hydrophobic monomer that is an (meth)acrylic acid ester. Examples of hydrophobic monomers include, methyl(meth)acrylate, ethyl(meth)acrylate, butyl(meth)acrylate, octyl(meth)acrylate, decyl(meth)acrylate, lauryl(methacrylate), stearyl (meth)acrylate, benzyl(meth)acrylate, phenyl(meth)acrylate, or combinations thereof. Preferred hydrophobic monomers are benzyl(meth)acrylate.

The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160; the disclosures of which are incorporated herein by reference. Preferred polymers include, for example, styrene-acrylic acid, styrene-acrylic acid-alkyl acrylate, styrene-maleic acid, styrene-maleic acid-alkyl acrylate, styrene-methacrylic acid, styrene-methacrylic acid-alkyl acrylate, and styrene-maleic acid half ester, wherein each type of monomer may correspond to one or more particular monomers. Examples of preferred polymers include but are not limited to styrene-acrylic acid copolymer, (3-methyl styrene)-acrylic acid copolymer, styrene-methacrylic acid copolymer, styrene-butyl acrylate-acrylic acid terpolymer, styrene-butyl methacrylate-acrylic acid terpolymer, styrene-methyl methacrylate-acrylic acid terpolymer, styrene-butyl acrylate-ethyl acrylate-acrylic acid tetrapolymer, and styrene-(a-methylstyrene)-butyl acrylate-acrylic acid tetrapolymer.

The water-soluble acrylic polymer is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B, and C blocks is chosen to be the hydrophilic monomer and the remaining blocks are hydrophobic blocks dissimilar from one another.

The water-soluble acrylic polymer useful in the pigment-based inks of the present invention is desirably present in the pigment based inkjet ink at a concentration of greater than 0.6 weight percent based on the total weight of the ink. In a preferred embodiment of the present invention the ink composition comprises a polyurethane described above and a water-soluble polymer described above wherein, the ratio of total amount of polyurethane and acrylic polymer(s) to pigment is from 0.5 to 1.5 and the ratio of polyurethane polymer to acrylic polymer is from 0.5 to 2. The use of acrylic polymer in the clear ink is optional.

In another useful embodiment, the components of the ink composition are selected such that the ink viscosity is less than 3.5 centapoise at 25 degrees Celsius, typically less than 3.0, and suitably less than 2.5. Ink compositions defined by these preferred embodiments are capable of achieving high firing frequencies with low variability for a large number of firing events.

Surfactants may be added to adjust the surface tension of the ink to an appropriate level. In a particular embodiment, relative dynamic and static surface tensions of various pigment based inks and clear protective ink of an ink set may be controlled as described in copending, commonly assigned U.S. Application Ser. No. 60/892,176, filed Feb. 28, 2007 to control intercolor bleed between the inks. The surfactants may be anionic, cationic, amphoteric, or nonionic and used at levels of 0.01 to 5% of the ink composition. Examples of suitable nonionic surfactants include, linear, or secondary alcohol ethoxylates (such as the TERGITOL® 15-S and TERGITOL® TMN series available from Union Carbide and the BRIJ® series from Uniquema), ethoxylated alkyl phenols (such as the TRITON® series from Union Carbide), fluoro surfactants (such as the ZONYLS® from DuPont; and the FLUORADS® from 3M), fatty acid ethoxylates, fatty amide ethoxylates, ethoxylated, and propoxylated block copolymers (such as the PLURONIC® and TETRONIC® series from BASF, ethoxylated and propoxylated silicone based surfactants (such as the SILWET® series from CK Witco), alkyl polyglycosides (such as the GLUCOPONS® from Cognis) and acetylenic polyethylene oxide surfactants (such as the Surfynols from Air Products).

Examples of anionic surfactants include carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the STRODEX® series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents," 1995, North American Editor.

A biocide (0.01-1.0% by weight) may also be added to prevent unwanted microbial growth that may occur in the ink over time. A preferred biocide for the inks employed in the present invention is PROXEL® GXL (Zeneca Colours Co.) at a concentration of 0.05-0.1% by weight or/and KORDEK® (Rohm and Haas Co.) at a concentration of 0.05-0.1% by weight (based on 100% active ingredient). Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

The pH of the aqueous ink compositions of the invention may be adjusted by the addition of organic or inorganic acids or bases. Inorganic bases are preferred; however, small amounts of organic bases, such as triethanolamine, may be used to adjust the pH of the ink. Useful inks may have a preferred pH of from 4 to 10, depending upon the type of pigment being used. Desirably, the pH of the present ink is from 6 to 9, and suitably from 7.5 to 8.5. Inks of the present invention may optionally contain multivalent cations such as, for example, calcium, magnesium, copper, nickel, barium, and aluminum at levels between 10 and 1000 parts per million.

The invention is summarized above. Inkjet printing systems useful in the invention comprise a printer, at least one ink, and an image recording element, typically a sheet (herein also "media"), suitable for receiving ink from an inkjet printer. The method of the invention employs the inkjet printer of the invention to provide an image on media. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation or an actuator that is made to move.

Drop-on-demand (DOD) liquid emission devices have been known as ink printing devices in inkjet printing systems for many years. Early devices were based on piezoelectric actuators such as are disclosed in U.S. Pat. Nos. 3,946,398 and 3,747,120. A currently popular form of inkjet printing, thermal inkjet (or "thermal bubble jet"), uses electrically resistive heaters to generate vapor bubbles which cause drop emission, as is discussed in U.S. Pat. No. 4,296,421. In another process, known as continuous inkjet, a continuous stream of droplets is generated, a portion of which are deflected in an image-wise manner onto the surface of the image-recording element, while un-imaged droplets are caught and returned to an ink sump. Continuous inkjet printers are disclosed in U.S. Pat. Nos. 6,588,888; 6,554,410; 6,682,182; 6,793,328; 6,866,370; 6,575,566; and 6,517,197.

The FIGURE shows one schematic example of an inkjet printer 10 that includes a protective cover 40 for the internal components of the printer. The printer contains a recording media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording media supply 20 in a media supply tray to a region where the printhead 30 deposits droplets of ink onto the media sheet. The printed media collection 22 is accumulated in an output tray.

The following examples illustrate, but do not limit, the utility of the present invention.

EXAMPLES

Polyurethane Binders Used in the Examples

Unless otherwise specified the procedure for synthesizing the polyurethane of the following examples involved charging a vessel with acid containing diol and PDMS or polyether amine or diol, followed by addition of diiosocyanate and subsequent polymerization.

Comparative Polyurethane PU-1 A polyurethane was made by polymerizing 41% isophorone diisocyanate, 24% 2,2-bis(hydroxymethyl)propionic acid (DMPA), and 35% of a 2000 Mw polytetrahydrofuran polyol. The resulting 100-acid number polyurethane had a weight average molecular weight of 20,400 and 95% of the acid groups were neutralized with potassium hydroxide.

Inventive Polyurethane PU-2 A polyurethane was made by polymerizing 41% isophorone diisocyanate, 24% 2,2-bis(hydroxymethyl)propionic acid (DMPA), 33% of a 2000 Mw polytetrahydrofuran polyol, and 2% of aminopropyl terminated polydimethyl siloxane having a molecular weight of 3000 (DMS-A15® Gelest, Inc.). The resulting 100-acid number polyurethane had a weight average molecular weight of 21,000 and 95% of the acid groups were neutralized with potassium hydroxide.

Inventive Polyurethane PU-3 A polyurethane was made by polymerizing 41% isophorone diisocyanate, 24% 2,2-bis(hydroxymethyl)propionic acid (DMPA), 30% of a 2000 Mw polytetrahydrofuran polyol, and 5% of aminopropyl terminated polydimethyl siloxane having a molecular weight of 3000 (DMS-A15® Gelest, Inc.). The resulting 100-acid number polyurethane had a weight average molecular weight of 16,800 and 95% of the acid groups were neutralized with potassium hydroxide.

Inventive Polyurethane PU-4 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% of aminopropyl terminated polydimethyl siloxane having a molecular weight of 3000 (DMS-A15® Gelest, Inc.). The resulting 100-acid number polyurethane had a weight average molecular weight of 19,000 and 95% of the acid groups were neutralized with potassium hydroxide.

Inventive Polyurethane PU-5 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% of aminopropyl terminated polydimethyl siloxane having a molecular weight of 3000 (DMS-A15® Gelest, Inc.). The polymer was synthesized by pre-reacting the aminopropyl terminated polydimethyl siloxane with an excess of isophorone diisocyanate followed by the addition of the polytetrahydrofuran polyol and DMPA. The resulting 100-acid number polyurethane had a weight average molecular weight of 20,700 and 95% of the acid groups were neutralized with potassium hydroxide.

Inventive Polyurethane PU-6 A polyurethane was made by polymerizing 41% isophorone diisocyanate, 24% 2,2-bis(hydroxymethyl)propionic acid (DMPA), 15% of a 2000 Mw polytetrahydrofuran polyol, and 20% of aminopropyl terminated polydimethyl siloxane having a molecular weight of 3000 (DMS-A15® Gelest, Inc.). The resulting 100-acid number polyurethane had a weight average molecular weight of 27,500 and 95% of the acid groups were neutralized with potassium hydroxide.

Inventive Polyurethane PU-7 A polyurethane was made by polymerizing 41% isophorone diisocyanate, 24% 2,2-bis(hydroxymethyl)propionic acid (DMPA), 15% of a 2000 Mw polytetrahydrofuran polyol, and 20% of aminopropyl terminated polydimethyl siloxane having a molecular weight of 3000 (DMS-A15® Gelest, Inc.). The polymer was synthesized by pre-reacting the aminopropyl terminated polydimethyl siloxane with an excess of isophorone diisocyanate followed by the addition of the polytetrahydrofuran polyol and DMPA. The resulting 100-acid number polyurethane had a weight average molecular weight of 15,500 and 95% of the acid groups were neutralized with potassium hydroxide.

Comparative Polyurethane PU-8 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% of aminopropyl terminated polydimethyl siloxane having a molecular weight of 3000 (DMS-A15® Gelest, Inc.). The resulting 100-acid number polyurethane had a weight average molecular weight of 4,160 and 95% of the acid groups were neutralized with potassium hydroxide.

Comparative Polyurethane PU-9 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% of aminopropyl terminated polydimethyl siloxane having a molecular weight of 3000 (DMS-A15® Gelest, Inc.). The resulting 100-acid number polyurethane had a weight average molecular weight of 7,030 and 95% of the acid groups were neutralized with potassium hydroxide.

Inventive Polyurethane PU-10 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% of aminopropyl terminated polydimethyl siloxane having a molecular weight of 3000 (DMS-A15® Gelest, Inc.). The resulting 100-acid number polyurethane had a weight average molecular weight of 11,300 and 95% of the acid groups were neutralized with potassium hydroxide.

Inventive Polyurethane PU-11 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% siloxane functionalized diol having a molecular weight of 1000 (SILAPLANE FM-DA11® Chisso America, Inc.). The resulting 100-acid number polyurethane had a weight average molecular weight of 17,200 and 95% of the acid groups were neutralized with potassium hydroxide.

Inventive Polyurethane PU-12 A polyurethane was made bypolymerizing 41% isophorone diisocyanate, 24% 2,2-bis(hydroxymethyl)propionic acid (DMPA), 25% of a 2000 Mw polytetrahydrofuran polyol, and 10% siloxane functionalized diol having a molecular weight of 5000 (SILAPLANE FM-DA21® Chisso America, Inc.). The resulting 100-acid number polyurethane had a weight average molecular weight of 17,000 and 95% of the acid groups were neutralized with potassium hydroxide.

Inventive Polyurethane PU-13 A polyurethane was made by polymerizing 41% isophorone diisocyanate, 24% 2,2-bis(hydroxymethyl)propionic acid (DMPA), 25% of a 2000 Mw polytetrahydrofuran polyol, and 10% siloxane functionalized diol having a molecular weight of 15,000 (SILAPLANE FM-DA26® Chisso America, Inc.). The resulting 100-acid number polyurethane had a weight average molecular weight of 17,300 and 95% of the acid groups were neutralized with potassium hydroxide.

Inventive Polyurethane PU-14 A polyurethane was made by polymerizing, 41% isophorone diisocyanate, 24% 2,2-bis(hydroxymethyl)propionic acid (DMPA), 25% of a 2000 Mw polytetrahydrofuran polyol, and 10% of hydroxyl terminated polydimethyl siloxane containing 14 to 18 mole % of diphenylsiloxane linkage having a molecular weight of 900-1000 (PDS-1615® Gelest, Inc.). The resulting 100-acid number polyurethane had a weight average molecular weight of 20,000 and 95% of the acid groups were neutralized with potassium hydroxide.

Weight Average Molecular Weight

Samples of the polyurethanes were analyzed using size-exclusion chromatography (SEC) at 35.0 C in tetrahydrofuran (THF) containing 1.0% formic acid. The column set consists of three 7.5 mm×300 mm Plgel mixed-B columns from Polymer Laboratories (Varian, Inc.), calibrated with narrow-molecular-weight distribution polystyrene standards.

Preparation of Magenta Pigment Dispersions

C-1 A dispersion of cyan pigment PB 15:3 with an acrylic copolymer made from 37 wt % benzyl methacrylate, 30 wt % n-octadecylmethacrylate, and 33 wt % methacrylic acid as the pigment dispersant. The dispersant having 90% of the acid groups neutralized with potassium hydroxide.

M-1 A dispersion of magenta pigment Ciba Cromophtal Jet Magenta PR2BC with an acrylic copolymer made from 37 wt % benzyl methacrylate, 30 wt % n-octadecylmethacrylate, and 33 wt % methacrylic acid as the pigment dispersant. The dispersant having 90% of the acid groups neutralized with potassium hydroxide.

Y-1 A dispersion of yellow pigment PY74 an acrylic copolymer 37 wt % benzyl methacrylate, 30 wt % n-octadecylmethacrylate, and 33 wt % methacrylic acid, and an acrylic copolymer made from 77.5 wt % benzyl methacrylate and 22.5 wt % methacrylic acid, both polymers having 90% of the acid groups neutralized with potassium hydroxide.

K-1 A dispersion of carbon black pigment Cabot Black Pearls 880 with an acrylic copolymer made from 37 wt % benzyl methacrylate, 30 wt % n-octadecylmethacrylate, and 33 wt % methacrylic acid as the pigment dispersant. The dispersant having 90% of the acid groups neutralized with potassium hydroxide.

Pigment Ink Preparations

Into an approximately 150 ml high density polyethylene bottle with magnetic stirring, the following components were added in order: high purity water, 0.02 wt % of the biocide KORDEK® MLX, 3 wt % of glycerol, 4 wt % of 2-pyrrolidinone, 2 wt % of 1-(2-hydroxyethyl)-2-pyrrolidinone, 3 wt % of 1,2-hexanediol, 0.1 wt % of the STRODEX® PK-90 surfactant, 1.2 wt % of polyurethane (from an approximately 25 to 30 wt % aqueous solution). Pigment dispersion was added as described below in Table I. 1N KOH was added if necessary to adjust pH to about 8.3-8.5. The resulting 125 g of ink was stirred for at least an hour and filtered with a 1.0 um disk filter.

TABLE 1

Pigment Concentrations in Colored Inks

| Ink Color | Pigment and Level |
|---|---|
| Cyan | 2.2 wt % C-1 |
| Magenta | 3.5% M-1 |
| Yellow | 2.75% Y-1 |
| Black | 1.675% K-1, 0.45% C-1, 0.375% M-1 |

Clear Ink Preparations

Into an approximately 150 ml high density polyethylene bottle with magnetic stirring, the following components were added in order: high purity water, 0.02 wt % of the biocide Kordek MLX, 12 wt % of glycerol, 6 wt % of ethylene glycol, 2 wt % of 1,2-pentanediol, 0.75 wt % of the Tergitol 15-S-5 surfactant, 1.6 wt % of polyurethane (from an approximately 25 to 30 wt % aqueous solution), and 0.8% of an acrylic copolymer made from 67 wt % benzyl methacrylate and 33% methacrylic acid. 1N KOH was added if necessary to adjust pH to about 8.3-8.5. The resulting 125 g of ink was stirred for at least an hour and filtered with a 1.0 um disk filter.

Additional clear inks were prepared according the formula above except that the polyurethane concentration was raised to 2.4%. Samples of these clear inks were characterized by a turbidity measurement and the results are reported below in Table 3.

Preparation of Ink Sets

Inks sets comprising cyan, magenta, yellow, black, and clear inks prepared with the same experimental polyurethane polymers were assembled and used to fill ink cartridges for printing in a Kodak 5100 All-in-One inkjet printer. The polyurethanes used to prepare each ink set are described below in Table 2.

TABLE 2

Definition of Ink Sets

| Ink Set | Polyurethane |
|---|---|
| S-1 (comparative) | PU-1 - no PDMS in polyurethane |
| S-2 (inventive) | PU-2 - 2 wt % PDMS |
| S-3 (inventive) | PU-3 - 5 wt % PDMS |
| S-4 (inventive) | PU-4 - 10 wt % PDMS |
| S-5 (inventive) | PU-5 - 10 wt % PDMS - pre-reacted |
| S-6 (inventive) | PU-6 - 20 wt % PDMS |
| S-7 (inventive) | PU-7 - 20 wt % PDMS - pre-reacted |
| S-8 (comparative) | PU-8 oligomeric 4,000 Mw |
| S-9 (comparative) | PU-9 oligomeric 7,000 Mw |
| S-10 (inventive) | PU-10 11,300 Mw 10% PDMS |
| S-11 (inventive) | PU-11 graft PDMS |
| S-12 (inventive) | PU-12 graft PDMS |
| S-13 (inventive) | PU-13 graft PDMS |
| S-14 (inventive) | PU-14 PDMS-with diphenylsiloxane |

Durability Testing of Ink Sets Having Polyurethane Binders

Each ink set, S-1 through S-14, was loaded into the respective tank of a color ink cartridge suitable for printing on a Kodak 5100 All-In-One inkjet printer. The tank was loaded into the printer and a scratch test target was printed on a commercially available alumina-based glossy print media using the Kodak 5100 printer with commercially available print driver and printing modes optimized for the specific media. The test target consisted of three separate 64-patch targets made up of various color patches. One target each was scratch tested at 2, 10, and 60 minutes after print ejection using a round wire stylus with a 150 g load.

The overall scratch score was determined by examining each of the 64 image patches after scratching with the round wire stylus. If the scratch penetrated through the image such that the receiver was clearly visible the patch was scored with a 2. Scratches of this nature are easily visible and highly objectionable to a consumer. If the scratch was clearly visible under normal lighting conditions and not require any tilting of the image to view the scratch the patch was scored a 1. If a deformation of the surface was evident only after tilting (but no visible scratch was seen) the image the patch was scored a zero. Thus, the maximum worst possible abrasion resistance would result in a score of 128 and the best possible abrasion resistance would result in a score of zero. The scratch test results for each ink-set at the three times after print ejection are tabulated below in Table 3.

For each of the ink sets, S-1 through S-14, a set of four images was printed on two 8×10 sheets of Kodak Ultra Premium Glossy Photo Media. Printing was conducted using the appropriate print mode optimized for the media on the Kodak 5100 All-In-One inkjet printer. The overall image quality of the resulting images was evaluated as a combination of density, color reproduction, graininess (noise) and banding artifacts. A rating of good indicates a high quality photographic image deemed acceptable to a typical consumer. A rating of fair indicates the image is acceptable, but that it exhibits at least one noticeable defect from the image quality list above. A rating of poor indicates one more defects in the image quality such that the image would be unacceptable to a typical consumer. Although not shown here, the image quality is believed to be directly related to the firing performance of the inks (droplet velocity, velocity variation, drop volume, drop misdirection, and threshold voltage response).

TABLE 3

Results of Scratch Testing for Ink Sets

| Ink Set | 2-minute scratch score | 10-minute scratch score | 60-minute scratch score | 2.4% PU Clear ink turbidity | Jetting-image quality |
|---|---|---|---|---|---|
| S-1 comparative | 85 | 35 | 17 | 4.4 | Good |
| S-2 inventive | 68 | 28 | 14 | 10.0 | Good |
| S-3 inventive | 68 | 18 | 8 | 9.2 | Good |
| S-4 inventive | 25 | 0 | 0 | 76.2 | Good |
| S-5 inventive | 33 | 19 | 10 | 20.2 | Good |
| S-6 inventive | 10 | 1 | 0 | 38.3 | Good |
| S-7 inventive | 31 | 24 | 7 | 5.8 | Good |
| S-8 comparative | 1 | 0 | 0 | 19.2 | Poor |
| S-9 comparative | 34 | 14 | 0 | 8.4 | Poor |
| S-10 inventive | 30 | 1 | 0 | 13.7 | Fair |
| S-11 inventive | 67 | 22 | 4 | 4.26 | Good |
| S-12 inventive | 0 | 0 | 0 | 127 | Good |
| S-13 inventive | 7 | 1 | 0 | 481 | Good |
| S-14 inventive | 0 | 0 | 0 | >500 | Good |

The scratch results in Table 3 show that polyurethanes having weight average molecular weights greater than 10,000 and containing as low as 2% by weight of the total polymer as polydimethylsiloxane segments reduce the scratching propensity of the image at drying times of up to 60 minutes after print ejection and exhibit high image quality. Table 3 also shows that the ink sets with extremely good scratch resistance, such as sets S-4, S-6, S-12, S-13, and S-14 show turbidity values above about 20 in a clear ink solution containing 2.4 wt % polyurethane. Ink set S-5, made from a polyurethane containing 10% PDMS but prepared in a way that reduces the clear ink turbidity, produced improved but somewhat marginal blunt scratch durability. This suggests that PDMS containing polyurethanes having relatively large particle-like domains (containing large groupings of PDMS segments) can provide superior short-durability when used in a pigment ink composition.

The invention has been described in detail with particular reference to certain preferred embodiments thereof, but it will be understood that variations and modifications can be effected within the spirit and scope of the invention. The entire content of the patents and publications referred to in this document are incorporated herein by reference.

PARTS LIST 10 inkjet printer
12 image data source
18 ink tanks
20 recording medium supply
22 printed media collection
30 printhead
40 protective cover
100 carriage
215 optical sensor
302 media direction
303 print region
304 media direction
313 forward direction
320 pickup roller(s)
322 turn roller(s)
323 idler roller(s)
324 discharge roller(s)
325 star wheel(s)
360 media supply tray
371 media sheet
375 further optical sensor
380 media output tray
390 printed media sheet

The invention claimed is:

1. An inkjet printing system, comprising an inkjet printer responsive to digital signals and containing an ink composition comprising:
    (a) water,
    (b) dispersed pigment particles,
    (c) a humectant, and
    (d) a polyurethane additive having at least a first soft segment having siloxane groups, the additive having a weight average molecular weight of at least 10,000 daltons and a sufficient number of acid groups to provide an acid number greater than 60.

2. The printing system of claim 1, wherein the pigment particles are not dispersed by a polyurethane polymeric dispersant.

3. The printing system of claim 1, wherein the pigment particles are dispersed with a polymeric dispersant.

4. The printing system of claim 1, wherein the pigment particles are dispersed with a surfactant.

5. The printing system of claim 1, wherein the first soft segment comprises a polydimethylsiloxane prepolymer.

6. The printing system of claim 5 wherein the polydimethylsiloxane prepolymer has a weight average molecular weight between 400 and 20,000 daltons.

7. The printing system of claim 5, wherein the polydimethylsiloxane prepolymer has a weight average molecular weight between 1000 and 15,000 daltons.

8. The printing system of claim 1, wherein the first soft segment is present in the polymer at between 2% and 30% by weight of the total polymer.

9. The printing system of claim 8, wherein the first soft segment is present in the polymer at between 5% and 20% by weight of the total polymer.

10. The printing system of claim 1, wherein the polyurethane additive further comprises at least a second soft segment comprising a polyether, polyester or polycarbonate segment.

11. The printing system of claim 10, wherein the second soft segment is present at from 2% to 50% by weight of the total polymer.

12. The printing system of claim 10, wherein the second soft segment is present at between 5% and 40% by weight of the total polymer.

13. The printing system of claim 10, wherein the second soft segment is present at between 10% and 35% by weight of the total polymer.

14. The printing system of claim 10, wherein the second soft segment is a prepolymer having a weight average molecular weight between 1000 and 3000 daltons.

15. The printing system of claim 1, wherein the first soft segment comprises an alkylamino siloxane prepolymer which provides urea bonds in the polyurethane.

16. The printing system of claim 15, wherein the at least one alkylamino siloxane prepolymer is present at between 2% and 20% by weight of the total polymer.

17. The printing system of claim 15, wherein the at least one alkylamino siloxane prepolymer is present at between 2% and 10% by weight of the total polymer.

18. The printing system of claim 15, further comprising a second soft segment that comprises a polyether prepolymer.

19. The printing system of claim 1, wherein the first soft segment has siloxane groups pendant to the polymer backbone.

20. The printing system of claim 1, wherein the acid groups on the polyurethane are at least partially neutralized using a monovalent inorganic base.

21. The printing system of claim 20, wherein at least 70% of the available acid groups on the polyurethane are neutralized with a monovalent inorganic base.

22. The printing system of claim 1, wherein the pigment particles are self dispersed without the need for a separate dispersant.

23. An inkjet ink composition comprising;
   (a) water,
   (b) dispersed pigment particles,
   (c) a humectant, and
   (d) a polyurethane additive having at least a first soft segment having siloxane groups, the additive having a weight average molecular weight of at least 10,000 daltons and a sufficient number of acid groups to provide an acid number greater than 60.

24. An ink set of claim 23 comprising two or more colored ink compositions of different colors.

25. A method for printing an inkjet image comprising:
   I) providing an aqueous inkjet ink comprising:
      (a) water,
      (b) pigment particles dispersed with a dispersant or self dispersing without the need for a dispersant,
      (c) at least one humectant, and
      (d) at least one polyurethane additive which is distinct from any polymeric dispersant for the pigment, the dispersant having at least one first soft segment having siloxane groups and having a weight average molecular weight of at least 10,000 daltons and a sufficient number of acid groups to provide an acid number greater than 60; and
   II) jetting the inkjet ink in the form of ink drops onto a recording element to form a printed image.

* * * * *